United States Patent [19]
Knight

[11] 3,884,251
[45] May 20, 1975

[54] CYLINDER-OPERATED VALVE
[75] Inventor: Houston W. Knight, Whittier, Calif.
[73] Assignee: FMC Corporation, San Jose, Calif.
[22] Filed: May 2, 1974
[21] Appl. No.: 466,443

[52] U.S. Cl. ............... 137/615; 251/63.4; 141/207
[51] Int. Cl. .................... B67c 3/00; B67d 5/00
[58] Field of Search ......... 137/615; 251/25, 28, 43, 251/61, 77, 85, 12, 63.4, 63.6; 141/207, 290

[56] References Cited
UNITED STATES PATENTS

| | | | |
|---|---|---|---|
| 1,623,431 | 4/1927 | McVoy | 251/63.4 |
| 2,707,378 | 5/1955 | Ryan | 251/63.4 X |
| 2,751,183 | 6/1956 | Crookston | 251/63.4 X |
| 3,099,297 | 7/1963 | Knight | 141/207 |
| 3,176,730 | 4/1965 | Knight | 141/290 |
| 3,638,670 | 2/1972 | Allen | 251/61 |

Primary Examiner—Martin P. Schwadron
Assistant Examiner—Robert J. Miller
Attorney, Agent, or Firm—W. W. Ritt; C. E. Tripp

[57] ABSTRACT

A fluid flow control valve especially for fluid loading arms, the valve including a pneumatic or hydraulic powered cylinder-piston means to close it against whatever upstream pressure might be present, and to maintain it in fully closed condition during whatever pressure surges might occur. In one embodiment, the valve also includes a helically-wound coil spring that biases the valve's closure element towards its closed position, causing it to close independently of actuation of the piston when the upstream pressure is below a predetermined value.

9 Claims, 5 Drawing Figures

FIG_2

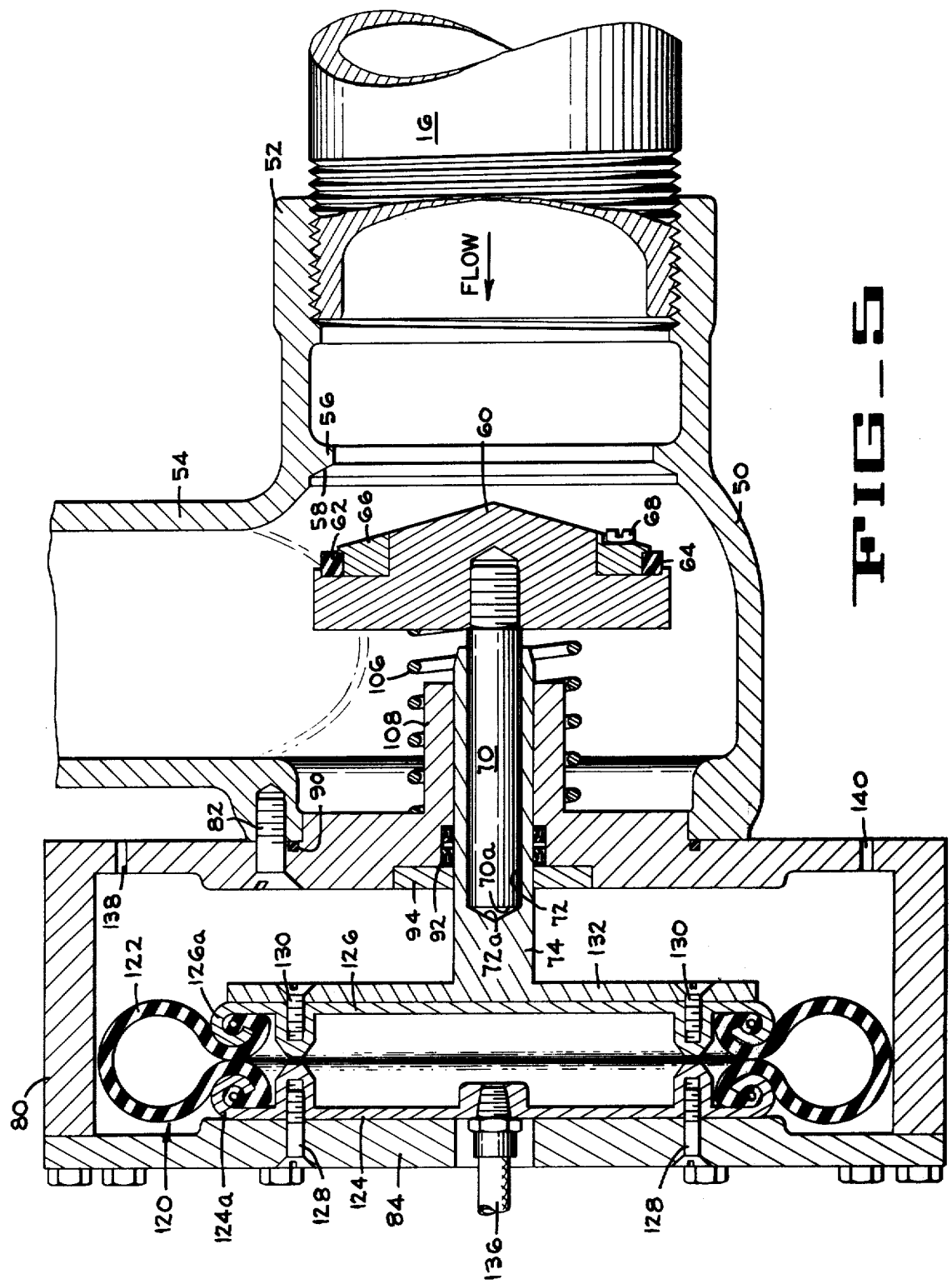

3,884,251

CYLINDER-OPERATED VALVE

BACKGROUND OF THE INVENTION

This invention relates to flow control valves for use in fluid loading arms, and more particularly to cylinder-operated valves with provision for closing automatically if the upstream pressure falls below a predetermined value.

In the employment of fluid loading arms, such as the type described in Knight U.S. Pat. No. 3,099,297, issued July 30, 1963, and Knight U.S. Pat. No. 3,176,730, issued Apr. 6, 1965, to load gasoline and other petroleum products into highway tank trucks, the flow of fluid through the arm has been controlled very satisfactorily by a remotely controllable pressure-operated valve of the type described in Bloomquist U.S. Pat. No. 3,206,158, issued Sept. 14, 1965. However, recent changes in governmental regulations regarding air pollution have made valves that close under little or no pressure unacceptable for use in fluid loading arms, since these valves, such as that of the aforementioned Bloomquist patent, leak momentarily when pressure surges occur in the fluid. Furthermore, valves of this type are not bubble tight, that is they do not establish an absolute fluid-tight seal when they are closed and thus they can allow escape of fluid in small amounts into the atmosphere in violation of some regulations.

SUMMARY OF THE INVENTION

The present invention solves the foregoing and other problems by providing a fluid flow control valve that is actuated by a remotely controllable pneumatic or hydraulic powered cylinder and piston assembly, the assembly connected to the valve's closure element in a manner to assure absolute, bubble-tight closure of the valve against any upstream fluid pressure that might exist, and also to assure that the valve will remain closed in this bubble-tight condition even when subjected to surges in this fluid pressure. The valve includes a disc-shaped closure element mounted on a cylindrical stem that is slidably received in a longitudinal bore in the rod of the piston, thereby to facilitate positive closure of the valve by movement of the piston and closure element toward the valve seat, and yet to facilitate retraction of the piston without necessarily causing the valve to open. The diameter of the piston is significantly greater than the diameter of the valve closure element, so that no matter what fluid pressure exists upstream of the valve the piston can force the closure element against the valve seat to provide a bubble-tight seal therewith, and can maintain that seal even when subjected to surges in that upstream pressure. Because of the slip-fit between the closure element's stem and the piston rod, the valve will remain closed when the piston is retracted unless there is sufficient fluid pressure upstream of the valve to move the closure element off the valve seat, and in one embodiment the valve is provided with a helical coil spring surrounding the closure element's stem to exert a predetermined closing force on the element to cause the valve to close by itself, and to keep it closed, when the upstream fluid pressure is below a pre-established value. When this helical coil spring is omitted, the valve is free to open when the piston is in its retracted position.

Accordingly, one object of the present invention is to provide an improved fluid flow control valve for use especially in fluid loading arms.

Another object of the present invention is to provide a cylinder-operated valve that will not leak, even momentarily, when surges in fluid pressure occur upstream.

Still another object of the present invention is to provide a cylinder-operated valve for achieving absolute, bubble-tight restriction of flow through a fluid loading arm.

Additional objects and advantages of the present invention will become apparent from the following description thereof, taken in conjunction with the accompanying drawings.

BRIEF DESCRIPTION OF THE DRAWINGS

FIG. 5 is a view like FIG. 4, showing the valve in its open condition.

DESCRIPTION OF THE PREFERRED EMBODIMENTS

Figure 1:
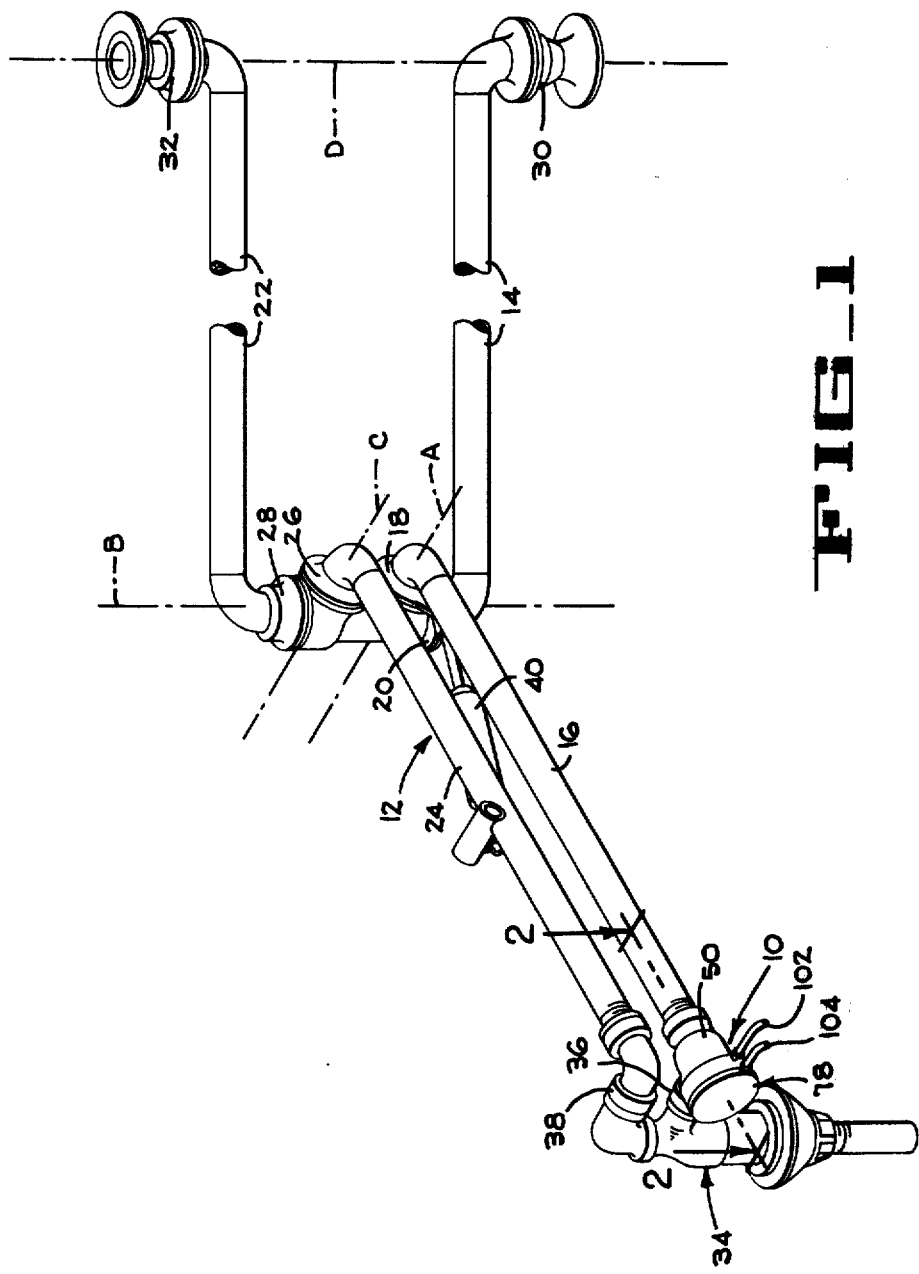
FIG. 1 is a view in perspective of a fluid loading arm that includes a cylinder-operated valve according to the present invention.

In reference first to FIG. 1, a cylinder-operated valve 10 according to the present invention is shown installed in functional position on a fluid loading arm 12, the arm in this instance being of the vapor recovery type having a fluid delivery conduit system comprising inner and outer rigid conduits 14, 16 interconnected for relative pivotal movement about horizontal and vertical axes A, B by pipe swivel joints 18, 20, and also having a vapor return conduit system including inner and outer rigid conduits 22, 24 interconnected by pipe swivel joints 26, 28 also for relative pivotal movement about horizontal axis C and vertical axis B.

The inner end of the conduit 14 is connected by a pipe swivel joint 30 to the upper end of a fluid riser pipe (not shown) that provides support as well as fluid to this conduit 14, and in similar manner the inner end of the conduit 22 is connected by a pipe swivel joint 32 to the lower end of a vapor return conduit (not shown). The swivel joints 30, 32 are coaxial about the vertical axis D, so that the entire arm 12 can be pivoted horizontally about this axis D for maneuvering into functional position.

The outer ends of the conduits 16, 24 are connected to a fluid delivery - vapor recovery head assembly 34 by horizontally oriented swivel joints 36, 38, so that as the outer conduits 16, 24 are raised or lowered in unison by operation of the hydraulic cylinder piston unit 40, the head assembly 34 remains in its vertical orientation.

Further details of the loading arm 12 are fully described in G. W. Bloomquist U.S. Patent Application Ser. No. 282,809, filed Aug. 22, 1972, and this application is hereby expressly incorporated by reference in the present application. Since these details are not critical to the present invention, further description thereof in the present application is not considered necessary for purposes of fully describing the present invention.

Figure 2:
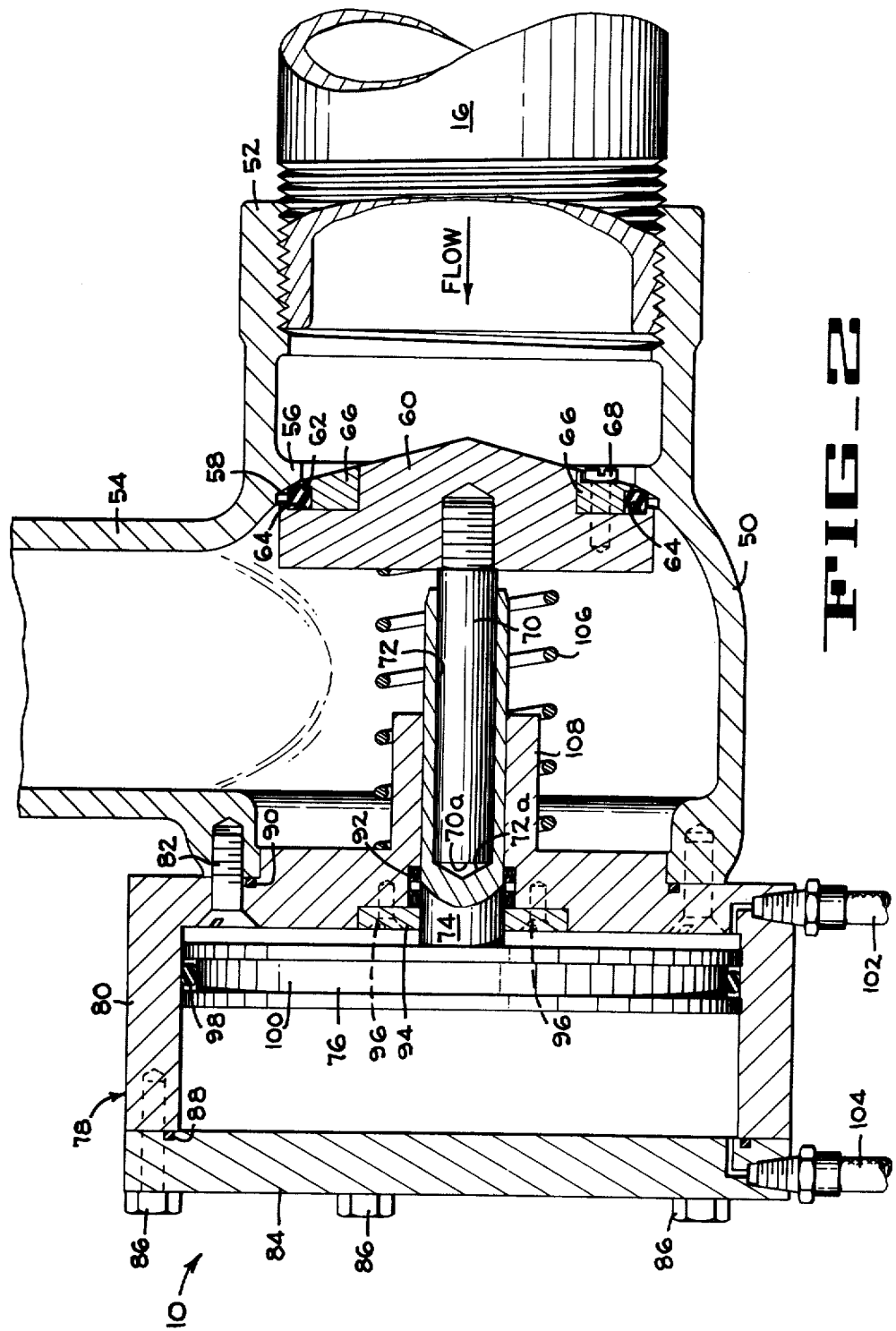
FIG. 2 is an enlarged horizontal section taken on line 2—2 of FIG. 1 of the valve in the loading arm showing the valve in its closed condition.
Figure 3:
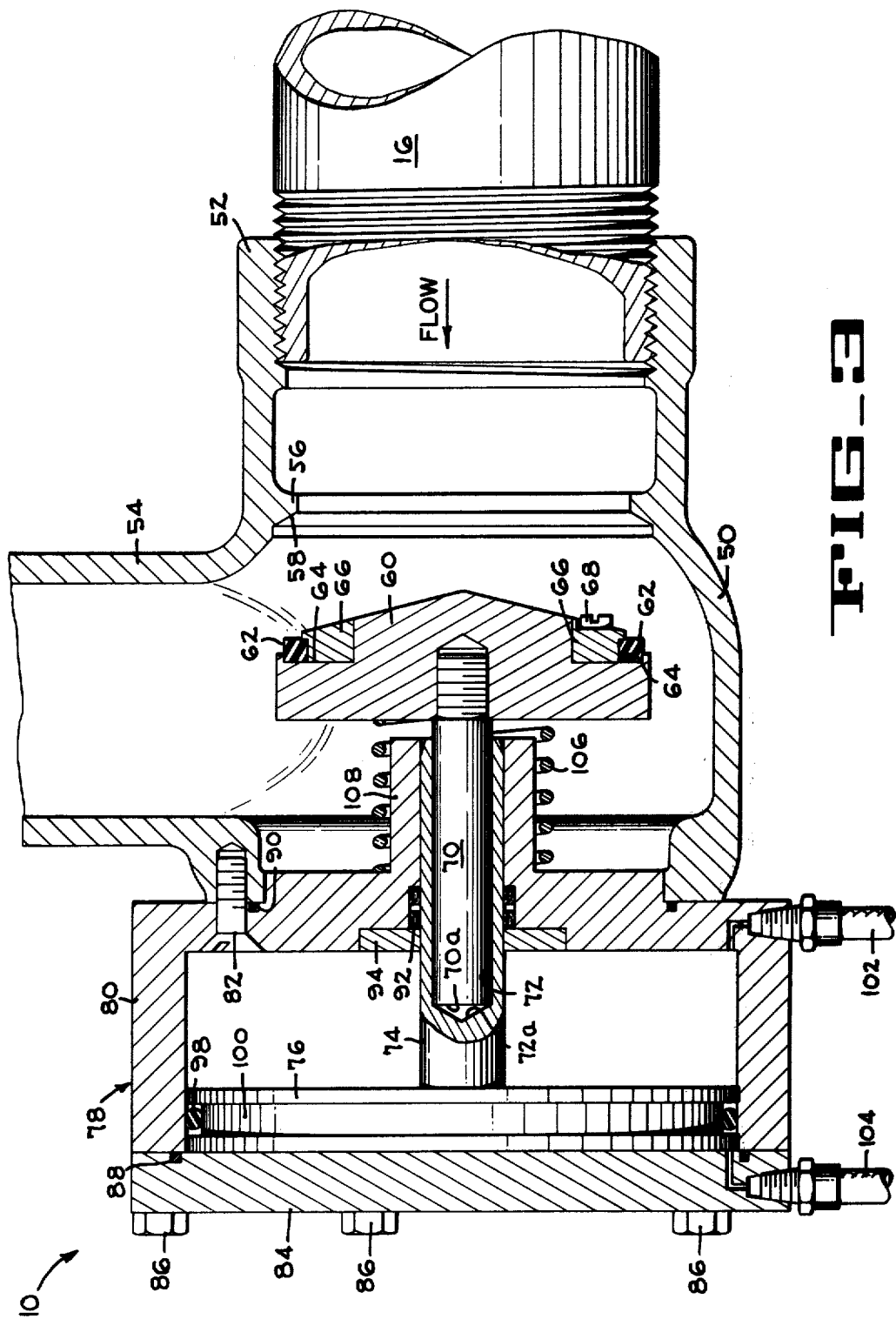
FIG. 3 is a view like FIG. 2, showing the valve in its open condition.

Referring now to FIGS. 2 and 3, the valve 10 of the present invention includes a valve body 50 having an inlet 52 and an outlet 54, the inlet 52 being threaded or otherwise secured to the fluid conduit 16, and the outlet 54 connecting to the pipe swivel joint 36 (FIG. 1). An annular inner flange 56 provides a valve seat 58, shown as a frusto-conical surface in this embodiment, for a disc-shaped valve closure element 60. The closure element or disc 60 preferably carries an annular seal ring 62 of suitable resilient material for establishing a fluid-tight seal with the seat 58, this seal ring 62 being retained in an annular groove 64 in the disc 60 by an annular retainer 66 secured in place by a plurality of circumferentially spaced cap screws 68 or the like (only one shown).

The disc 60 is threadedly secured to a cylindrical valve stem 70 that extends rearwardly from the disc 60 generally coaxially with the direction of fluid flow into the valve's inlet 52. This valve stem 70 is slidably fitted into a bore 72 in a piston rod 74 that extends towards the disc 60 and valve inlet 52 from a piston 76 enclosed for reciprocal movement in a cylinder 78. The cylinder 78 is comprised of a housing 80 secured at its inner end to, and forming the rear wall of, the valve body 50, as by a plurality of circumferentially spaced flat-head screws 82. The outer end of the housing 80 is closed by a cover plate 84 that is held in place by circumferentially spaced cap screws 86. Annular seals 88, 90 assures an air-tight seal between the cylinder's housing 80 and the cover plate 84 and valve body 50, respectively. Likewise, an annular seal or packing system 92, surrounding the piston rod 74 and held in place by an annular retainer 94 secured to the cylinder housing 80 by screws 96, provides a dynamic fluid-tight barrier between the rod and housing.

An annular seal element 98, positioned in an annular groove 100 in the periphery of the piston 76, provides a dynamic seal between the piston and the cylinder 78, so that by inletting air or hydraulic fluid into the cylinder through the line 102, and venting the line 104 to the atmosphere or a fluid reservoir, the piston 76 can be moved to the left from its position shown in FIG. 2 to the position shown in FIG. 3, i.e., in a valve opening direction. Correspondingly, the piston 76 can be moved to the right from the FIG. 3 to the FIG. 2 position, i.e., in a valve closing direction, by inletting air or hydraulic pressure through line 104 and exhausting it through line 102.

Since the valve stem 70 is prevented from sliding further into the bore 72 of the piston rod 74 by contact between the stem's outer end 70a and the bottom 72a of the bore, as the piston moves to the right it causes the valve disc 60 to also move in that direction until the seal element 62 is firmly seated in a bubble-tight manner on the valve seat 58. However, since the valve stem 70 is slip-fitted into the piston rod bore 72, movement of the piston 76 to the left from its FIG. 2 position will not open the valve, but instead place it in a condition to open in response to adequate fluid pressure in the inlet 52.

A helically wound compressed coil spring 106, surrounding the valve stem 70, the piston rod 72, and the journal-forming extension 108 of the cylinder housing 80, biases the valve disc 60 towards its closed position as shown in FIG. 2. The pressure exerted by the spring 106 is predetermined so that the valve disc 60 will not open until this pressure is exceeded by the pressure of the fluid in the inlet side of the valve. Accordingly, although the piston 76 is in its valve open position as shown in FIG. 3, the valve will remain closed in response to the pressure exerted by the spring 106 on the disc 60 until such pressure has been overcome by the fluid upstream of the disc.

With the helical spring 106 installed, the valve 10 of the present invention is self-closing when the upstream fluid pressure drops below the force exerted on the disc 60 by the spring 106, thereby precluding flow through the arm at a lower pressure. However, it should be understood that the spring 106 can be removed or omitted where it is desirable to allow the valve to open fully without any restriction when the piston 76 is in the "open" position shown in FIG. 3, and to close solely in response to the force exerted by the piston.

The diameter of the piston 76 significantly exceeds the diameter of the valve's seal element 62, thereby assuring that a fluid-tight, bubble-proof seal between the element 62 and the valve seat 58 will always be established when the piston is subjected to pneumatic or hydraulic pressure through the line 1 of the same valve as the fluid pressure existing in the valve's inlet 52, even though the seal element 62 is constructed of relatively hard plastic or other material of low compressibility.

Figure 4:
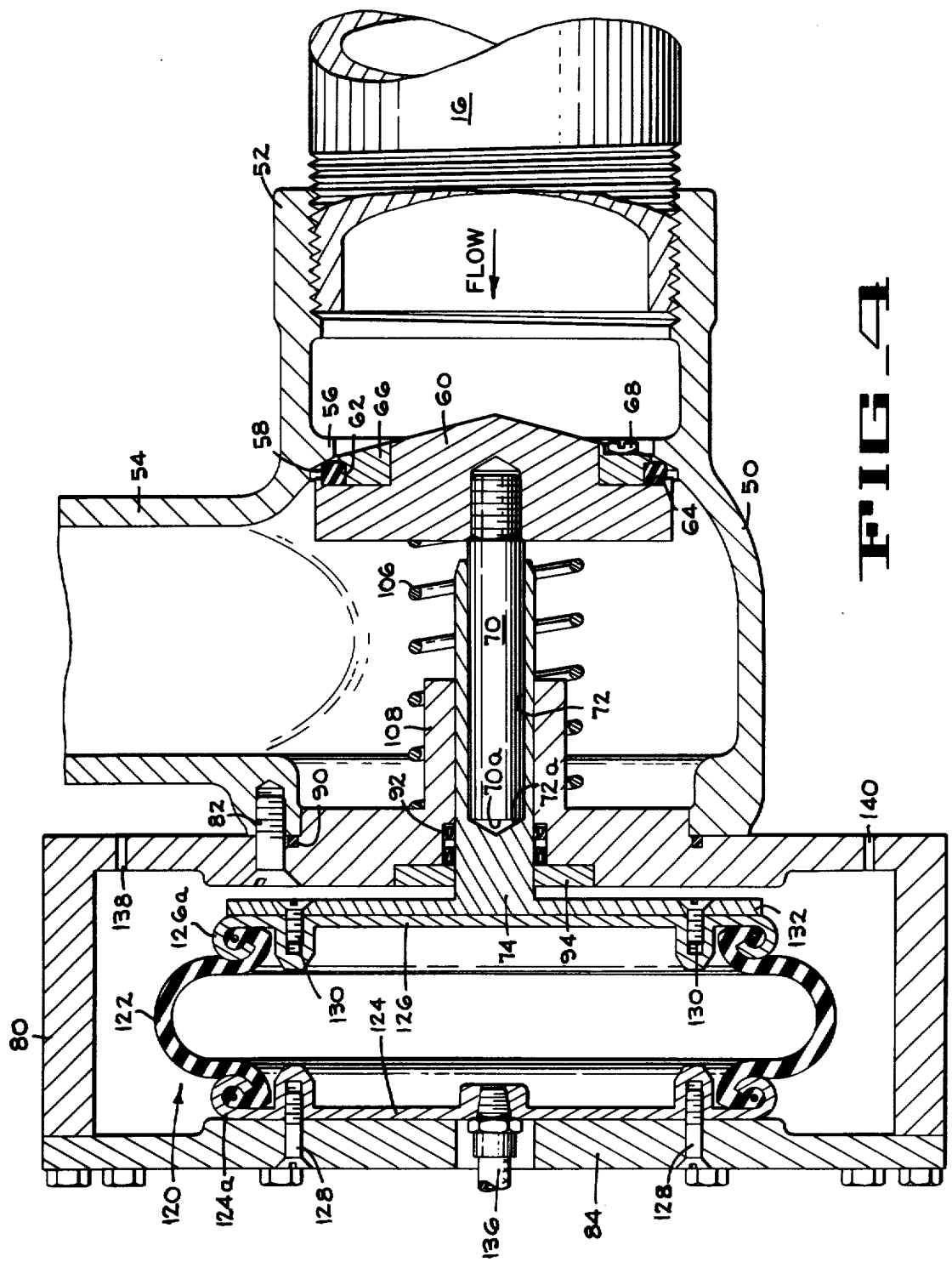
FIG. 4 is a view like FIG. 2, but showing a pneumatic bellows assembly for operating the valve.

If desired, the valve 10 of the present invention can be modified by substitution of a bellows assembly 120 for piston 76, as shown in FIGS. 4 and 5. This assembly 120 comprises an annular flexible rubber bellows 122 extending between a pair of rigid circular plates 124, 126 that are crimped at their peripheries 124a, 126a in an air-tight manner to the ends of the bellows 122. The plate 124 is secured as by screws 128, to the inner surface of the cylinder's cover 84, and the other plate 126 is secured to the piston rod 74, as by screws 130 that extend through a radial flange 132 on the end of the rod 74 into the plate 126. The air of hydraulic lines 102, 104 (FIGS. 2 and 3) are replaced by a single line 136 that extends through the plate 124, and the housing 84 is vented to the atmosphere as at 138, 140.

When air or hydraulic fluid is inletted through the line 136 into the bellows assembly 120, the bellows 122 expands in an axial direction from its condition shown in FIG. 5, wherein the valve is open, into its condition shown in FIG. 4, wherein the valve is closed. Correspondingly, venting or exhausting the pressure in the bellows assembly 120 through the line 136 allows the bellows to return from its FIG. 4 position to that illustrated in FIG. 5, thereby placing the valve in condition to open in response to upstream fluid pressure in its inlet 52.

As will be noted, the cylinder's housing 80 and cover 84 in the embodiment of FIGS. 4 and 5 are configured slightly different than their counterparts in the FIGS. 2 and 3 embodiment, but in other respects are essentially identical therewith. With the exception of the above described modification of the piston rod 74, and of course the omission of the piston 76, the rest of the valve of FIGS. 4 and 5 is essentially identical with that of FIGS. 2 and 3, and thus the corresponding elements are designated by identical numbers.

Although the best mode contemplated for carrying out the present invention has been herein shown and described, it will be apparent that modification and variations may be made without departing from what is regarded to be the subject matter of the invention.

I claim:

1. In a fluid loading arm including at least one fluid product conduit connected to at least one pipe swivel joint for pivotal movement about the axis through said swivel joint, and a fluid pressure operated valve interconnected with the fluid product conduit in a position to control product flow therethrough, said valve including a valve body and a valve closure element secured to a valve stem for controlling flow through said valve body, the improvement comprising a. a fluid pressure responsive force means for operating said valve closure element, said force means comprising
  1. a housing forming a portion of said valve body,
  2. a piston rod slidably mounted in a wall of said housing and extending into said valve body towards said valve closure element, said piston rod having a longitudinal bore into which said valve stem slidably extends,
  3. spring means surrounding said piston rod and said valve stem, said spring means extending between said valve closure element and said housing, said spring means biasing said element towards a position precluding flow through said valve, and
  4. means for transmitting fluid pressure to said piston rod to cause said rod to move toward said valve closure element, and
 b. fluid pressure means to operate said fluid pressure responsive force means and cause movement of said valve closure element into a bubble-tight seal with said valve body regardless of the pressure existent in said fluid product conduit.

2. A fluid loading arm according to claim 1 wherein said fluid pressure responsive force means comprises a cylinder-piston assembly.

3. A fluid loading arm according to claim 2 wherein the cylinder-piston assembly includes a piston having a fluid pressure responsive surface area greater than the corresponding surface area of the valve closure element.

4. A fluid loading arm according to claim 3 wherein the cylinder-piston assembly is operably connected to a fluid pressure source other than that present in the product conduit.

5. A fluid loading arm according to claim 1 wherein said fluid pressure responsive force means includes a flexible bellows assembly.

6. A fluid loading arm according to claim 5 wherein said bellows assembly has a greater surface area responsive to fluid pressure than the fluid pressure responsive surface area of said valve closure element.

7. A fluid pressure operated valve especially for use in a fluid loading arm to control the flow of fluid product therethrough, said valve comprising a. a valve body,
 b. a valve closure element secured to a valve stem for controlling flow through said valve body,
 c. a fluid pressure responsive force means for operating said valve closure element, said force means comprising
  1. a housing forming a portion of said valve body,
  2. a piston rod slidably mounted in a wall of said housing and extending into said valve body towards said valve closure element, said piston rod having a longitudinal bore into which said valve slidably extends,
  3. spring means surrounding said piston rod and said valve stem, said spring means extending between said valve closure element and said housing, said spring means biasing said element towards a position precluding flow through said valve, and
  4. means for transmitting fluid pressure to said piston rod to cause said rod to move toward said valve closure element, said transmitting means having a greater fluid pressure responsive surface area than said valve closure element.

8. A valve according to claim 7 wherein said fluid pressure responsive force means comprises a cylinder-piston assembly.

9. A valve according to claim 7 wherein said fluid pressure responsive force means comprises a flexible bellows assembly.

* * * * *